United States Patent
Nakao

(10) Patent No.: US 7,778,150 B2
(45) Date of Patent: Aug. 17, 2010

(54) RADIO APPARATUS

(75) Inventor: Seigo Nakao, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 544 days.

(21) Appl. No.: 11/522,968

(22) Filed: Sep. 19, 2006

(65) Prior Publication Data

US 2007/0064592 A1 Mar. 22, 2007

Related U.S. Application Data

(60) Provisional application No. 60/717,734, filed on Sep. 19, 2005.

(51) Int. Cl.
*H04J 11/00* (2006.01)
(52) U.S. Cl. .................. 370/208; 370/278; 370/302; 370/329
(58) Field of Classification Search ............... None
See application file for complete search history.

(56) References Cited

U.S. PATENT DOCUMENTS

| 2003/0072452 A1 | 4/2003 | Mody et al. | |
|---|---|---|---|
| 2005/0013239 A1* | 1/2005 | Agrawal et al. | 370/206 |
| 2005/0157806 A1* | 7/2005 | Walton et al. | 375/267 |
| 2005/0163236 A1 | 7/2005 | Hammerschmidt et al. | |
| 2006/0018269 A1* | 1/2006 | Agrawal et al. | 370/321 |
| 2006/0104341 A1* | 5/2006 | Magee et al. | 375/231 |
| 2006/0268692 A1* | 11/2006 | Wright et al. | 370/229 |
| 2007/0097946 A1* | 5/2007 | Mujtaba | 370/349 |

FOREIGN PATENT DOCUMENTS

JP 2006-179876 6/2006

OTHER PUBLICATIONS

TGN SYNC: "TGn Sync, An IEEE 802.11n Protocol Standard Proposal Alliance. PHY Overview", IEEE 802.11N, Jun. 2004, p. 1-42.
Sinem Coleri et al., "Channel Estimation Techniques Based on Pilot Arrangement in OFDM Systems," IEEE Transactions on Broadcasting, Sep. 2002, pp. 223-229, vol. 48, No. 3.

* cited by examiner

*Primary Examiner*—Chirag G Shah
*Assistant Examiner*—Daniel Mitchell
(74) *Attorney, Agent, or Firm*—McDermott Will & Emery LLP

(57) ABSTRACT

A control unit adjusts the number of streams for each of a plurality of packet signals and specifies a packet signal whose number of streams is the maximum among the packet signals whose number of streams has been adjusted. The control unit assigns a known signal and a data signal to each of streams for the specified packet signal. While setting another stream, the control unit assigns an extensional known signal to the another stream. The control unit also assigns a known signal and a data signal to at least one of streams for the packet signals which have not been specified.

11 Claims, 14 Drawing Sheets

FIG.4A

| L-STF | L-LTF | L-SIG | HT-SIG | HT-STF | HT-LTF | HT-LTF | -HT-LTF | DATA 1 |
|---|---|---|---|---|---|---|---|---|
| L-STF -50ns | L-LTF -50ns | L-SIG -50ns | HT-SIG -50ns | HT-STF -400ns | HT-LTF -400ns | HT-LTF -400ns | HT-LTF -400ns | DATA 2 -400ns |
| L-STF -100ns | L-LTF -100ns | L-SIG -100ns | HT-SIG -100ns | HT-STF -200ns | HT-LTF -200ns | HT-LTF -200ns | -HT-LTF -200ns | DATA 3 -200ns |
| L-STF -150ns | L-LTF -150ns | L-SIG -150ns | HT-SIG -150ns | HT-STF -600ns | HT-LTF -600ns | HT-LTF -600ns | -HT-LTF -600ns | DATA 4 -600ns |

FIG.4B

| L-STF | L-LTF | L-SIG | HT-SIG | HT-STF | HT-LTF | HT-LTF | -HT-LTF | DATA 1 |
|---|---|---|---|---|---|---|---|---|
| L-STF -50ns | L-LTF -50ns | L-SIG -50ns | HT-SIG -50ns | HT-STF -400ns | HT-LTF -400ns | HT-LTF -400ns | -HT-LTF -400ns | DATA 2 -400ns |

FIG.5A

| HT-STF | HT-LTF | HT-SIG | HT-LTF | HT-LTF | -HT-LTF | DATA 1 |
|---|---|---|---|---|---|---|
| HT-STF -400ns | HT-LTF -400ns | HT-SIG -400ns | HT-LTF -400ns | HT-LTF -400ns | HT-LTF -400ns | DATA 2 -400ns |
| HT-STF -200ns | HT-LTF -200ns | HT-SIG -200ns | HT-LTF -200ns | HT-LTF -200ns | -HT-LTF -200ns | DATA 3 -200ns |
| HT-STF -600ns | HT-LTF -600ns | HT-SIG -600ns | HT-LTF -600ns | HT-LTF -600ns | -HT-LTF -600ns | DATA 4 -600ns |

FIG.5B

| HT-STF | HT-LTF | HT-SIG | -T-LTF | DATA 1 |
|---|---|---|---|---|
| HT-STF -400ns | HT-LTF -400ns | HT-SIG -400ns | -HT-LTF -400ns | DATA 2 -400ns |

FIG.8

| HT-STF1 | HT-LTF1 | HT-SIG1 | HT-LTF5 | HT-LTF9 | HT-LTF13 | HT-LTF17 | DATA A |
|---|---|---|---|---|---|---|---|
| HT-STF2 -50ns | HT-LTF2 -50ns | HT-SIG2 -50ns | HT-LTF6 -50ns | HT-LTF10 -50ns | HT-LTF14 -50ns | HT-LTF18 -50ns | DATA B -50ns |
| HT-STF3 -100ns | HT-LTF3 -100ns | HT-SIG3 -100ns | HT-LTF7 -100ns | HT-LTF11 -100ns | HT-LTF15 -100ns | HT-LTF19 -100ns | DATA C -100ns |
| HT-STF4 -150ns | HT-LTF4 -150ns | HT-SIG4 -150ns | HT-LTF8 -150ns | HT-LTF12 -150ns | HT-LTF16 -150ns | HT-LTF20 -150ns | DATA D -150ns |

RADIO APPARATUS

RELATED APPLICATIONS

This application claims the benefit of U.S. Provisional Patent Application No. 60/717,734, filed on Sep. 19, 2005 the disclosure of which Application is incorporated by reference herein.

BACKGROUND OF THE INVENTION

1. Field of the Invention

The present invention relates to radio apparatuses, and it particularly relates to a radio apparatus using multiple subcarriers.

2. Description of the Related Art

An OFDM (Orthogonal Frequency Division Multiplexing) modulation scheme is one of multicarrier communication schemes that can realize the high-speed data transmission and are robust in the multipath environment. This OFDM modulation scheme has been applied to the wireless standards such as IEEE802.11a/g and HIPERLAN/2. The packet signals in such a wireless LAN are generally transferred via a time-varying channel environment and are also subject to the effect of frequency selective fading. Hence, a receiving apparatus generally carries out the channel estimation dynamically.

In order for the receiving apparatus to carry out the channel estimation, two kinds of known signals are provided within a packet signal. One is the known signal, provided for all carries in the beginning of the burst signal, which is the so-called preamble or training signal. The other one is the known signal, provided for part of carriers in the data area of the burst signal, which is the so-called pilot signal (See Reference (1) in the following Related Art List, for instance).

Related Art List (1) Sinem Coleri, Mustafa Ergen, Anuj Puri and Ahmad Bahai, "Channel Estimation Techniques Based on Pilot Arrangement in OFDM Systems", *IEEE Transactions on broadcasting*, vol. 48, No.3, pp. 223-229, September 2002.

In wireless communications, adaptive array antenna technology is one of the technologies to realize the effective utilization of frequency resources. In adaptive array antenna technology, the directional patterns of antennas are controlled by controlling the amplitude and phase of signals, to be processed, in a plurality of antennas, respectively. One of techniques to realize higher data transmission rates by using such an adaptive array antenna technology is the MIMO (Multiple-Input Multiple-Output) system. In this MIMO system, a transmitting apparatus and a receiving apparatus are each equipped with a plurality of antennas, and a plurality of packet signals to be transmitted in parallel are set (hereinafter, each of a plurality of packets is called "stream"). That is, streams up to the maximum number of antennas are set for the communications between the transmitting apparatus and the receiving apparatus so as to improve the data transmission rates.

Moreover, combining this MIMO system with the OFDM modulation scheme results in a higher data transmission rate. In the MIMO system, the data rate can also be adjusted by increasing or decreasing the number of antennas to be used for data communications. Furthermore, the data rate can be adjusted in greater detail by applying the adaptive modulation to the MIMO system. To perform such an adjustment of data rates more reliably, the transmitting apparatus should acquire from the receiving apparatus the information on data rates suited for the radio channel between the transmitting apparatus and the receiving apparatus (hereinafter referred to as "rate information"). To raise the accuracy of the rate information like this, it is desired that the channel characteristics between a plurality of antennas in the transmitting apparatus and a plurality of antennas contained in the receiving apparatus, respectively, be acquired by the receiving apparatus.

Examples of the combinations of directivity patterns in the antennas of the transmitting apparatus and receiving apparatus in a MIMO system are as follows. One example is a case where the antennas of a transmitting apparatus have omni patterns and the antennas of a receiving apparatus have patterns in adaptive array signal processing. Another example is a case where both the antennas of the transmitting apparatus and those of the receiving apparatus have patterns in adaptive array signal processing. This is also called the beamforming. The system can be simplified in the former case. In the latter case, however, the directivity patterns of antennas can be controlled in greater detail, so that the characteristics thereof can be improved. Since in the latter case the transmitting apparatus performs adaptive array signal processing for transmission, it is necessary to receive beforehand from the receiving apparatus the known signals by which to estimate channels.

To improve the accuracy of rate information and the accuracy of beamforming in the above-mentioned requirements, it is necessary that the channel characteristics be acquired with high accuracy. To improve the accuracy in the acquisition of channel characteristics, it is desirable that the channel characteristics between a plurality of antennas contained in the transmitting apparatus and those in the receiving apparatus be acquired respectively. For this reason, the transmitting apparatus or the receiving apparatus transmits from all of antennas the known signals for use in channel estimation. Hereinafter, the known signals, for use in channel estimation, transmitted from a plurality of antennas will be referred to as "training signals" independently of the number of antennas to be used for data communication.

Under these circumstances, the inventor of the present invention came to recognize the following problems to be solved. When the training signals are transmitted, the number of streams containing known signals for use in channel estimation (hereinafter referred to as "channel estimation known signals") differs from that containing data. A known signal for setting AGC (Automatic Gain Control), hereinafter referred to as "AGC known signal", at the receiving side is assigned anterior to the channel estimation known signals. When an AGC known signal is assigned only in a stream where data is assigned, one of the channel estimation known signals is received in a state where the AGC known signal has not been received anterior thereto. In particular, when the strength of AGC known signal gets smaller at the receiving side, the gain of AGC is set to a value which is large to a certain degree. In so doing, when the strength of channel estimation known signal of a stream where the AGC known signal is not assigned is larger, there is a strong possibility that said channel estimation known signal may be amplified to such a degree that distortion is caused by AGC. As a result thereof, the error in channel estimation based on said channel estimation known signal becomes large.

On the other hand, when an AGC known signal is assigned to a stream where a channel estimation known signal is assigned, the number of streams to which the AGC known signal is assigned differs from that to which data is assigned. Hence, there is a possibility that the gain set by the AGC known signal is not suitable for the modulation of data. As a result, the demodulated data are subject to errors.

When CSMA (Carrier Sense Multiple Access) is carried out to allow the base station apparatus to multiplex the communication with a plurality of terminal apparatuses, the intervals at which the packet signals are transmitted are defined based on a period during which the carrier sense is to be done. However, in order to improve the transmission efficiency it is desirable that the transmission duration of packet signal be defined to be shorter. For that purpose, one basestation signal occupies a band during a predetermined period of time, and a plurality of packet signals are contiguously transmitted. Under such circumstances, it is desired that the degradation of transmission efficiency be prevented even in the case when the aforementioned signal for use in channel estimation is transmitted.

SUMMARY OF THE INVENTION

The present invention has been made under such circumstances and a general purpose thereof is to provide a radio apparatus that enhances the accuracy of channel estimation by preventing the degradation in transmission efficiency at the time of transmitting known signals for use in channel estimation.

In order to solve the above problems, a radio apparatus according to one embodiment of the present invention is a radio apparatus for transmitting, in a predetermined period of time, a plurality of packet signals each of which is formed by at least one stream and it comprises: an adjustment unit which adjusts the number of streams for the plurality of packet signals, respectively; a specifying unit which specifies a packet signal whose number of streams is maximum among the packet signals whose numbers of streams have been adjusted by the adjustment unit; a generation unit which includes a first means that assigns known signals and data signals to the streams, respectively, for the packet signal specified by said specifying unit and assigns extensional known signals to another stream by setting the another stream, and a second means that assigns a known signal and a data signal to at least one stream for a packet signal not specified by said specifying unit; and a transmitter which transmits a plurality of packet signals generated by the generation unit.

By employing a structure according to this embodiment, an extensional known signal is assigned to a packet signal where the number of streams to which a data signal is assigned is large, so that the duration of an extensional known signal can be made shorter and there the degradation in transmission efficiency can be prevented.

The specifying unit may not only specify a packet signal whose number of streams is maximum but also assign the specified packet signal to a rear position in the plurality of packet signals. In such case, a packet signal where the extensional known signal is placed is assigned to a rear portion and therefore the terminal apparatus can acquire the latest channel characteristics.

For the packet signal specified by the specifying unit, the generation unit may assign an extensional known signal to a timing other than a timing to which a data signal and a known signal are assigned. In such a case, the timing, to which a known signal is assigned, in a stream where a data signal is assigned is shifted or staggered from the timing, to which a known signal is assigned, in a stream where no data signal is assigned. Hence, the received powers of both the streams can be brought closer to each other and the deterioration of estimation in specifying a channel can be prevented.

The generation unit may define a first format in which known signals are contiguously arranged and a control signal is assigned to an anterior part thereof and another known signal is assigned anterior to the control signal, and a second format in which a control signal is assigned between known signals, while among the plurality of packet signals the first format is used in a leading packet signal, the second format is used in the remaining packet signals, and a known signal in the first format is used as a known signals in another stream in the packet signal specified by the specifying unit. In this case, the first format is used in the leading packet in the plurality of packet signals, so that the compatibility with a legacy system can be maintained. The second format is used in the remaining packet signals, so that the transmission efficiency can be improved. A portion corresponding to known signals in the first format is used, so that the transmission efficiency can be improved.

The generation unit may be such that, for the packet signal specified by the specifying unit, using a known signal, as a reference, assigned to one of main streams where a data signal is assigned, a cyclic timing shift within a known signal is applied to a known signal assign to the other streams and a timing shift is also applied to an extensional known signal assigned to sub-streams where no data signal is assigned, degrees of priority are set beforehand to amounts of timing shift and, for the main streams, the amounts of timing shift are used, in order, from one having a higher degree of priority, and for the sub-streams, the amounts of timing shift are used, in order, from one having a higher degree of priority. In such a case, the degrees of priority is defined in the amounts of timing shift and, for a stream where a data signal is assigned and for a stream where no data signal is assigned, the amounts of timing shift are used, in order, from one having a higher degree of priority. Hence, more of the same timing shift amounts can be used.

The generation unit may be such that, for the packet signal specified by the specifying unit, using a known signal, as a reference, assigned to one of main streams where a data signal is assigned, a cyclic timing shift within a known signal is applied to a known signal assign to the other streams and a timing shift is also applied to an extensional known signal assigned to sub-streams where no data signal is assigned, and different values of amounts of timing shift are set to the plurality of streams, respectively. In such a case, the timing shift amounts for the respective known signals assigned to a plurality of streams are of the same values, so that a receiving apparatus can cope easily when there are changes in streams that have data assigned.

In the generation unit, the known signal and the extensional known signal may be formed by repeating a predetermined unit in time domain, a combination of signs of the predetermined unit may be defined so that an orthogonality holds among the streams, and the combination of signs of the predetermined unit may be so defined as to be fixed in the plurality of streams, respectively. In this case, the combination of signs is fixed, the processing can be made simpler.

The "predetermined unit" may be applicable in a case defined not only by the time domain but also the frequency domain. In the latter case, the durations corresponding respectively to a plurality of units may differ from one another when the predetermined unit is converted to the time domain.

In the generation unit, the known signal and the extensional known signal may be formed by repeating a predetermined unit in time domain, while a combination of signs of the predetermined unit is defined so that an orthogonality holds among the streams, a degree of priority may be given beforehand to the combination of signs of the predetermined unit, and for a stream where a data signal is assigned, combinations of signs may be used in order, from one having a higher degree of priority and, for a stream where no data signal is assigned, combinations of signs may be used in order, from one having a higher degree of priority. In this case, the combinations of signs are used, in order, from one having a higher degree of priority. Hence, a common circuit can be used in both the calculation of channel characteristics for streams where no data signal is assigned and the calculation of channel characteristics for streams where a data signal is assigned.

The generation unit may be such that the cyclic timing shift is also applied to a data signal in the packet signal specified by the specifying unit, and an amount of timing shift for the main streams may be used as the amount of timing shift. In this case, the data signal can be demodulated.

The radio apparatus may further comprise a modification unit which modifies at least the packet signal, specified by the specifying unit, among the plurality of packet signals generated by the generation unit and outputs a modified signal to the transmitter. The modification unit may include: a first processing unit which extends the number of main streams up to the number of a plurality of streams and then, for the extended stream, applies a cyclic timing shift within a known signal to a known signal assigned to the other streams using as a reference a known signal assigned to one of the extended streams; and a second processing unit which extends the number of sub-streams up to the number of a plurality of streams and then, for the extended streams, applies a cyclic timing shift within an extensional known signal to an extensional known signal assigned to the other streams using as a reference an extensional known signal assigned to one of the extended streams. The amount of timing shift may be set in a manner that the respective values of timing shift amounts used for the extended streams in the first processing unit are respectively equal to those for the extended streams in the second processing unit.

An absolute value of the timing shift amount in the generation unit may be so set as to be greater than that in the modification unit. Data may be composed of a plurality of streams. A known signal may be composed of a plurality of streams. A control signal may be composed of a plurality of streams.

It is to be noted that any arbitrary combination of the above-described structural components and expressions changed among a method, an apparatus, a system, a recording medium, a computer program and so forth are all effective as and encompassed by the present embodiments.

Moreover, this summary of the invention does not necessarily describe all necessary features so that the invention may also be sub-combination of these described features.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which:

FIG. 4A and 4B illustrate packet formats in a communication system shown in FIG. 2;

FIG. 5A and 5B illustrate another packet formats in a communication system shown in FIG. 2;

FIG. 8 illustrates a packet format of packet signals to be finally transmitted in a communication system shown in FIG. 2.

DETAILED DESCRIPTION OF THE INVENTION

Figure 1:
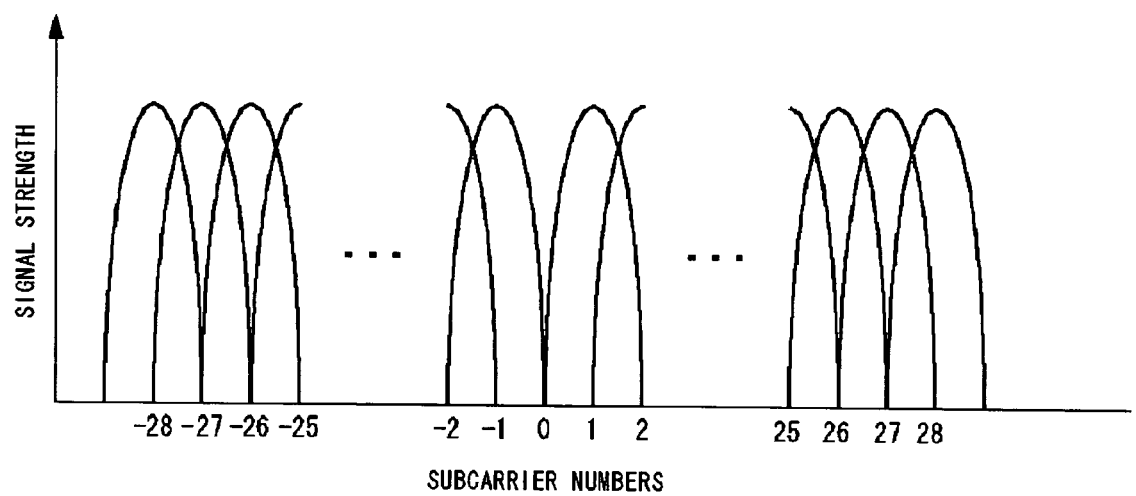
FIG. 1 illustrates a spectrum of a multicarrier signal according to an embodiment of the present invention.

The invention will now be described based on the following embodiments which do not intend to limit the scope of the present invention but exemplify the invention. All of the features and the combinations thereof described in the embodiments are not necessarily essential to the invention.

An outline of the present invention will be given before a specific description thereof. Embodiments of the present invention relate to a MIMO system comprised of at least two radio apparatuses. One of the radio apparatuses corresponds to a transmitting apparatus whereas the other thereof corresponds to a receiving apparatus. The transmitting apparatus generates one packet signal composed of a plurality of streams. In particular, a description will be given here of a processing performed when the transmitting apparatus transmits training signals. Any known technique may be used for the adaptive modulation processing using the aforementioned rate information and the beamforming and therefore the repeated explanation will be omitted here.

The transmitting apparatus corresponds to a base station apparatus. The base station apparatus basically performs CSMA on a plurality of terminal apparatuses. In order to enhance the transmission efficiency, the base station apparatus occupies a radio bandwidth over a predetermined period of time and transmits a plurality of packets contiguously. The latter will be described in particular here, and any known technique may be used concerning CSMA and therefore the explanation therefor will be omitted here. Under such circumstances, if the number of streams to which the AGC known signal is assigned differs from that to which the channel estimation known signal is assigned, there is a possibility that the error in estimation of channel characteristics in the receiving apparatus will deteriorate. Also, it is intended that the drop in transmission efficiency be prevented even when the training signals are to be transmitted. For these reasons, the following processing will be carried out in the present embodiment.

The base station apparatus acquires a plurality of data signals to be transmitted, respectively. The base station apparatus checks on the number of streams for a plurality of data signals and arranges the plurality of data signals in ascending order of the number of streams. That is, a plurality of data signals are arranged in a manner that data signals having the larger number of streams are placed in posterior part. The base station apparatus appends known signals to a plurality of data signals, respectively, so as to produce a plurality of packet signals. The base station apparatus generates the packet signals so that the packet signal placed in the rearmost part are the aforementioned training signals. When generating the training signals, the base station apparatus assigns a channel estimation known signal to a position posterior to an AGC known signal (hereinafter such a stream will be referred to as "main stream"). The base station apparatus provides another stream in a position posterior to this channel estimation known signal (such a stream will be referred to as "sub-stream"), and assigns also a channel estimation known signal to the sub-stream. The base station assigns a data signal to a position posterior thereto in the main stream.

FIG. 1 illustrates a spectrum of a multicarrier signal according to an embodiment of the present invention. In particular, FIG. 1 shows a spectrum of a signal in the OFDM modulation scheme. One of a plurality of carriers in an OFDM modulation scheme is generally called a subcarrier. Herein, however, a subcarrier is designated by a "subcarrier number". In a MIMO system, 56 subcarriers, namely, subcarrier numbers "−28" to "28" are defined herein. It is to be noted that the subcarrier number "0" is set to null so as to reduce the effect of a direct current component in a baseband signal. On the other hand, 52 subcarriers, namely, subcarrier numbers "−26" to "26" are defined in a system which is not compatible with a MIMO system (hereinafter referred to as a "legacy system"). One example of legacy systems is a wireless LAN complying with the IEEE802.11a standard. The unit of one signal in the time domain is the unit of one signal composed of a plurality of subcarriers, and this unit will be called "OFDM symbol".

The respective subcarriers are modulated by a modulation scheme which is set variably. Used here is any of modulation schemes among BPSK (Binary Phase-Shift Keying), QPSK (Quadrature Phase-Shift Keying), 16-QAM (Quadrature Amplitude Modulation) and 64-QAM.

Convolutional coding is applied, as an error correction scheme, to these signals. The coding rates for the convolutional coding are set to ½, ¾ and so forth. The number of data to be transmitted in parallel is set variably. The data are transmitted as packet signals and each of packet signals to be transmitted in parallel is called "stream" as described earlier. As a result thereof, since the mode of modulation scheme and the values of coding rate and the number of streams are set variably, the data rate is also set variably. It is to be noted that the "data rates" may be determined by arbitrary combination of these factors or by one of them. If the modulation scheme is BPSK and the coding rate is ½ in a legacy system, the data rate will be 6 Mbps. If, on the other hand, the modulation scheme is BPSK and the coding rate is ¾, the date rate will be 9 Mbps.

Figure 2:
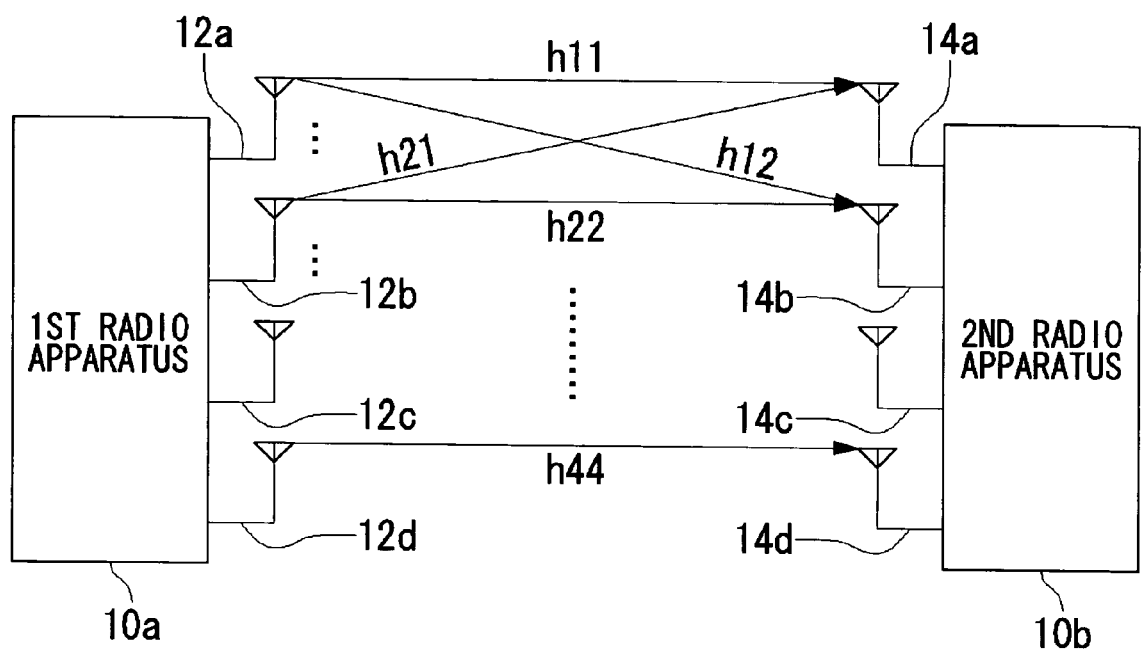
FIG. 2 illustrates a structure of a communication system according to an embodiment of the present invention.

FIG. 2 illustrates a structure of a communication system 100 according to an embodiment of the present invention. The communication system 100 includes a first radio apparatus 10a and a second radio apparatus 10b, which are generically called "radio apparatus 10". The first radio apparatus 10a includes a first antenna 12a, a second antenna 12b, a third antenna 12c and a fourth antenna 12d, which are generically referred to as "antennas 12", and the second radio apparatus 10b includes a first antenna 14a, a second antenna 14b, a third antenna 14c and a fourth antenna 14d, which are generically referred to as "antennas 14". Here, the first radio apparatus 10a corresponds to a transmitting apparatus, whereas the second radio apparatus 10b corresponds to a receiving apparatus.

An outline of a MIMO system will be described as a structure of the communication system 100. Assume herein that data are being transmitted from the first radio apparatus 10a to the second radio apparatus 10b. The first radio apparatus 10a transmits respectively data of a plurality of streams from the first antenna 12a to fourth antenna 12d, respectively. As a result, the data rate becomes higher. The second radio apparatus 10b receives the data of a plurality of streams by the first antenna 14a to fourth antenna 14d. The second radio apparatus 10b separates the received signals by adaptive array signal processing and demodulates independently the data of a plurality of streams.

Since the number of antennas 12 is "4" and the number of antennas 14 is also "4" here, the number of combinations of channels between the antennas 12 and the antennas 14 is "16". The channel characteristic between from the ith antenna 12i to the jth antenna 14j is denoted by $h_{ij}$. In FIG. 2, the channel characteristic between the first antenna 12a and the first antenna 14a is denoted by $h_{11}$, that between from the first antenna 12a to the second antenna 14b by $h_{12}$, that between the second antenna 12b and the first antenna 14a by $h_{21}$, that between from the second antenna 12b to the second antenna 14b by $h_{22}$, and that between from the fourth antenna 12d to the fourth antenna 14d by $h_{44}$. For the clarity of illustration, the other channels are omitted in FIG. 2. Note that the roles of the first radio apparatus 10a and the second radio apparatus 10b may be reversed. It is assumed here that the training signals are transmitted from the first radio apparatus 10a to the second radio apparatus 10b.

Figure 3:
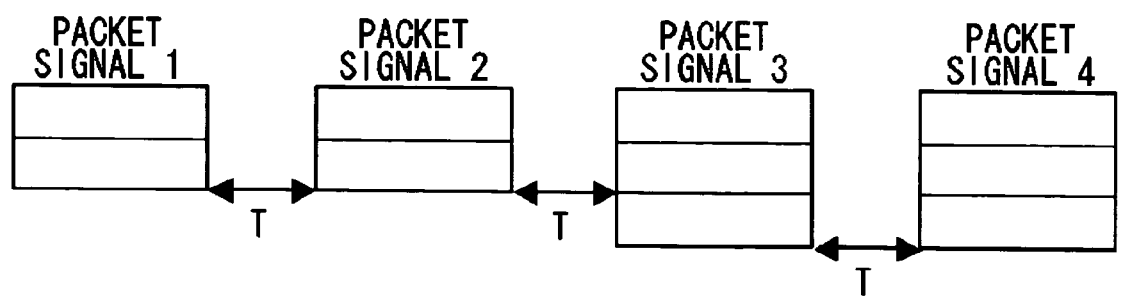
FIG. 3 illustrates an arrangement of packet signals according to an embodiment of the present invention.

FIG. 3 illustrates an arrangement of packet signals according to an embodiment of the present invention. FIG. 3 shows a plurality of packet signals transmitted from the first radio apparatus shown in FIG. 2, which is a base station apparatus. For the clarity of explanation, it is assumed here that four packet signals, namely, "packet signal 1" to "packet signal 4", are to be transmitted. The number of streams in "packet signal 1" and "packet signal 2" is "2" whereas the number of streams in "packet signal 3" and "packet signal 4" is "3". The interval between adjacent packet signals is assumed to be "T". And the interval "T" is assumed to be a duration shorter than the duration necessary for carrier sensing. In other words, a terminal apparatus, not shown, which performs carrier sense in a duration longer than the interval "T", cannot start the transmission of a packet signal during the interval "T". As a consequence, the base station apparatus can transmit a plurality of packet signals consecutively, which means that it occupies this band over the whole duration of transmitting the plurality of packet signals.

As shown in FIG. 3, the base station apparatus places packet signals with a smaller number of streams in the anterior part and packet signals with a larger number of streams in the posterior part. Further, the base station apparatus uses a packet signal placed last as a training signal. That is, a packet signal with the largest number of streams is used as a training signal. The structure of a normal packet signal and the structure of a training signal will be described later. For a training signal, it is to be noted, one or more of other stream are added to those of a normal packet. In so doing, the smaller the number of streams to be added, the shorter the length of the streams to be added will be. As a result, there will be less drop in transmission efficiency. Since a radio channel tends to vary, the placement of a training signal at the end ensures that the terminal apparatus acquires the latest channel characteristics.

FIGS. 4A and 4B show packet formats for a communication system 100. The packet formats shown in FIGS. 4A and 4B are not the formats of training signals but those of ordinary packet signals. FIG. 4A represents a case where the number of streams is "4", and FIG. 4B a case where the number of streams is "2". In FIG. 4A, it is assumed that data contained in four streams are to be transmitted, and packet formats corresponding to the first to fourth streams are shown in order from top row to bottom row.

In the packet signal corresponding to the first stream, "L-STF", "HT-LTF" and the like are assigned as preamble signals. "L-STF", "L-LTF", "L-SIG", and "HT-SIG" are a known signal for AGC setting, a known signal for channel estimation and a control signal compatible with legacy system, and a control signal compatible with MIMO system, respectively. The control signal compatible with MIMO system, for example, contains information on the number of streams and a destination of data. "HT-STF" and "HT-LTF" are a known signal for AGC setting and a known signal, for channel estimation, compatible with a MIMO system, respectively. On the other hand, "DATA 1" is a data signal. Note that L-LTF and HT-LTF are used not only for AGC setting but also for timing estimation.

In the packet signal corresponding to the second stream, "L-STF(−50 ns)", "HT-LTF(−400 ns)" and the like are assigned as preamble signals. And, in the packet signal corresponding to the third stream, "L-STF(−100 ns)", "HT-LTF(−200 ns)" and the like are assigned as preamble signals. And, in the packet signal corresponding to the fourth stream, "L-STF(−150 ns)", "HT-LTF(−600 ns)" and the like are assigned as preamble signals.

Here, "−400 ns" and the like indicate the amounts of timing shift in CDD (Cyclic Delay Diversity). The CDD is a processing where in a predetermined interval a time-domain waveform is shifted, by a shift amount, in a posterior direction and then the waveform pushed out from the rearmost part in the predetermined interval is assigned cyclically in a header portion of the predetermined interval. That is, "L-STF(−50 ns)" is "L-STF" given a cyclic timing shift by a delay of −50 ns. Note that L-STF and HT-STF are each structured by a repetition of an 800 ns duration and that the other parts such as HT-LTF and the like are each constituted by a repetition of a 3.2 μs duration. It is also to be noted that "DATA 1" to "DATA 4" are also subjected to CDD and the amounts of timing shift are of the same values as those for HT-LTFs assigned anterior thereto.

In the first stream, HT-LTFs are assigned in the order of "HT-LTF", "−HT-LTF", "HT-LTF" and "−HT-LTF" from the top. Here, these in this order are called "a first component", "a second component", "a third component" and "a fourth component" in all the streams. A receiving apparatus extracts a desired signal for the first stream by computing "first component minus (−) second component plus (+) third component minus (−) fourth component" for received signals of all the streams. The receiving apparatus extracts a desired signal for the second stream by computing "first component+second component+third component+fourth component" for received signals of all the streams. The receiving apparatus extracts a desired signal for the third stream by computing "first component−second component−third component+fourth component" for received signals of all the streams. The receiving apparatus extracts a desired signal for the fourth stream by computing "first component+second component−third component−fourth component" for received signals of all the streams. Note that the addition and subtraction processing is done by vector operation.

As with a legacy system, "52" subcarriers are used for the part from "L-LTF" to "HT-SIG" and so forth. Note that "4" subcarriers out of the "52" subcarriers correspond to pilot signals. On the other hand, the part of "HT-LTF" or the like and thereafter uses "56" subcarriers.

FIG. 4B is similar to the first stream and second stream of the packet formats shown in FIG. 4A. Here, the assignment of "HT-LTFs" in FIG. 4B differs from that of "HT-LTFs" in FIG. 4A. That is, there are only the first components and the second components of HT-LTFs. In the first stream, HT-LTFs are assigned in the order of "HT-LTF" and "HT-LTF" from the top, whereas in the second stream they are assigned in the order of "HT-LTF" and "−HT-LTF". A receiving apparatus extracts a desired signal for the first stream by computing "first component+second component" for received signals of all the streams. Also, the receiving apparatus extracts a desired signal for the second stream by computing "first component−second component" for received signals of all the streams.

FIG. 5A and 5B illustrate another packet format in the communication system 100. "L-STF", "L-LTF" and "L-SIG" shown in FIG. 4A are not assigned in FIG. 5A. That is, the signals by which to maintain the compatibility with legacy system is not assigned. Instead, since "L-STF" and the like are not assigned in FIG. 5A, the transmission efficiency of packet signals is more improved than that of FIG. 4A. In the first stream, the same four "HT-LTFs" and the like as in FIG. 4A are assigned following "HT-STF". However, "HT-SIG" is assigned between the first HT-LTF of "HT-LTF" and the second HT-LTF of "−HT-LTF". "DATA 1" is assigned posterior to the four "HT-LTFs". In the second to fourth streams, the signals obtained as a result of the CDD of "−400 ns", "−200 ns" and "−600 ns" applied to the first stream are assigned respectively. FIG. 5B is similar to the first stream and second stream of the packet formats shown in FIG. 5A. That is, FIG. 5B is the format that corresponds to FIG. 4B.

Figure 6A:
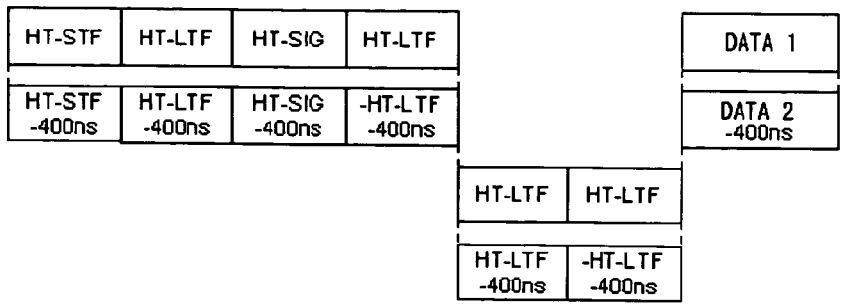
FIG. 6A to 6D illustrate packet formats for training signals in a communication system shown in FIG. 2.
Figure 6B:
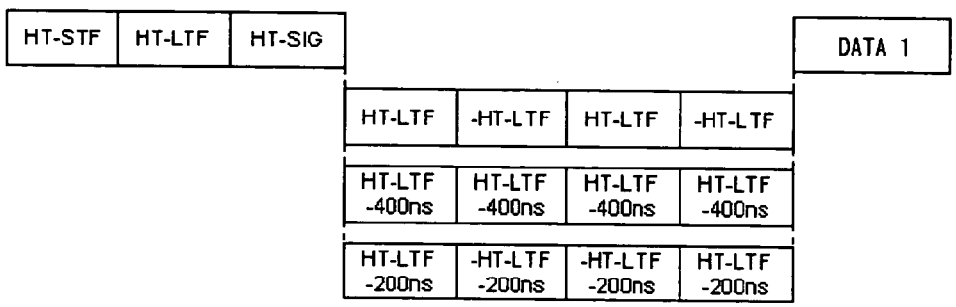
Figure 6C:
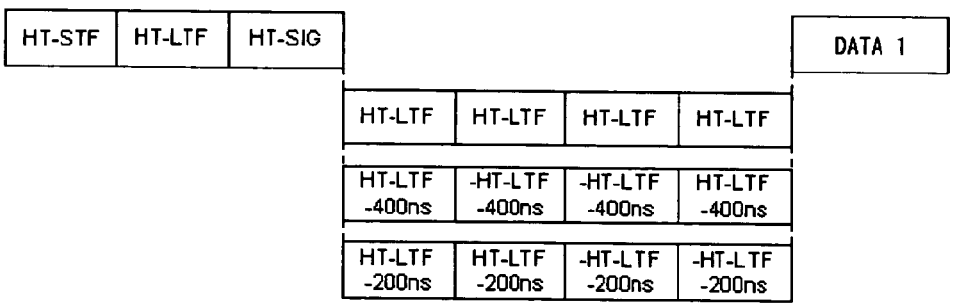
Figure 6D:
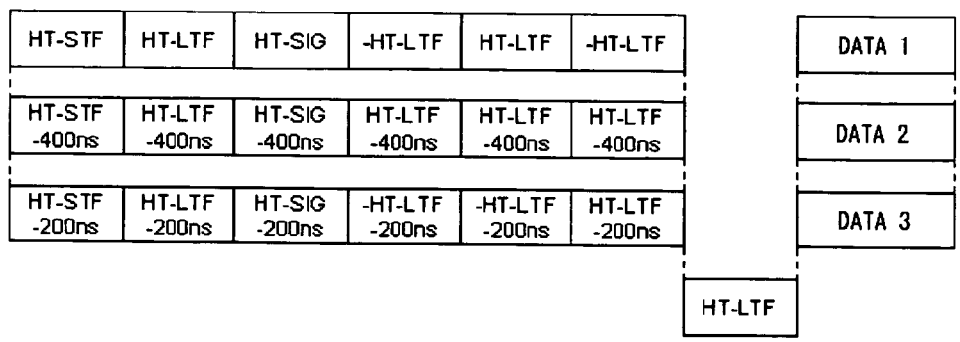

FIGS. 6A to 6D illustrate packet formats for training signals in the communication system 100. FIGS. 6A to 6D are training signals for the packet signals shown in FIGS. 5A and 5B. FIG. 6A is the case when the number of main streams in which data signals are assigned is "2"; FIGS. 6B and 6C are the case when the number of main streams is "1"; and FIG. 6D is the case when the number of main streams is "3". In other words, in FIG. 6A the data signals are assigned in the first and the second stream; in FIGS. 6B and 6C the data signal is assigned in the first stream; and in FIG. 6D the data signals are assigned in the first to the third stream.

The assignment up to HT-LTF in the first stream and the second stream in FIG. 6A is the same as that of FIG. 5B. In a position posterior thereto, however, a blank duration is provided in the first stream and the second stream. In the third and fourth streams, on the other hand, HT-LTFs are assigned to the position corresponding to the blank duration in the first and second streams. And, following the HT-LTFs assigned to the third and fourth streams, data are assigned to the first and second streams.

The assignment as described above makes the number of streams to which "HT-STF" is assigned equal to the number of streams to which a data signal is assigned, so that the error contained in the gain set by "HT-STF" becomes small at a receiving apparatus, thus preventing the worsening of data signal receiving characteristics. Also, since the "HT-LTFs" assigned to the third and fourth streams are only assigned to these two streams, the error contained in the gain set by "HT-STF" becomes small at a receiving apparatus, thus preventing a drop in the accuracy of channel estimation.

Here it is assumed that the degrees of priority for the amounts of timing shift are defined in the descending order of "0 ns", "−400 ns", "−200 ns" and "−600 ns". In other words, "0 ns" has the highest degree of priority, and "−600 ns" the lowest. Accordingly, the values of "0 ns" and "−400 ns" are used as timing shift amounts in the first stream and the second stream, respectively. In the third stream and the fourth stream, the values of "0 ns" and "−400 ns" are also used as timing shift amounts, respectively. As a result, the combination of "HT-LTF" and "HT-LTF" in the first stream is also used in the third stream, and the combination of "HT-LTF(−400 ns)" and "–HT-LTF(–400 ns)" in the second stream is also used in the fourth stream, thus making the processing simpler.

The assignment up to HT-LTF in the first stream in FIG. 6B is the same as that of the first stream in FIG. 5B. Here "HT-LTF" is assigned to one position only. In a position posterior thereto, however, a blank duration is provided in the first stream. In the second to fourth streams, on the other hand, HT-LTFs are assigned to the positions corresponding to the blank duration in the first stream. And, following the HT-LTFs assigned to the second to fourth streams, data is assigned to the first stream. Here, the arrangement of HT-LTFs assigned to the second and the third stream is similar to that in FIG. 4A.

The packet format of FIG. 6C is structured the same way as for that of FIG. 6B. However, the combination of the signs of "HT-LTF" in FIG. 6C differs from that in FIG. 6B. Here, the combination of the signs of "HT-LTFs" is so defined that an orthogonal relationship holds among the streams. Furthermore, in FIG. 6C, the combination of the signs of "HT-LTFs" is so defined as to be fixed for each of a plurality of streams. Similar to FIG. 6B, "0 ns", "–400 ns" and "–200 ns", which have higher degrees of priority, are used even in the second to fourth streams in FIG. 6C.

The arrangement up to HT-LTFs in the first to the third stream of FIG. 6D is the same as the arrangement of the first to the third stream in FIG. 5A. In a position posterior thereto, a blank duration is provided in the first to the third stream. One "HT-LTF" is assigned to a fourth period corresponding to the blank durations in the first to third streams. And, following the HT-LTF assigned to the fourth stream, data are assigned to the first to third streams. According to the above-described degree of priority, the amount of timing shift for HT-LTF assigned to the fourth stream is set to "0 ns".

Two "HT-LTFs" are assigned to the third and the fourth stream, namely, the sub-streams in FIG. 6A. Four "HT-LTFs" are assigned to the second and the fourth stream, namely, the sub-streams in FIG. 6B and FIG. 6C. One "HT-LTF" is assigned to the fourth stream, namely, the sub-stream in FIG. 6D. Comparing these, it is found that the length of "HT-LTF" assigned to the sub-stream in FIG. 6D is the shortest. That is, as the number of main streams in packet signal where training signals are to be produced increases, the length of sub-stream will decrease. Utilizing this characteristic, according to the present embodiment the packet signal whose number of main streams is larger is checked in order to produce the training signals.

FIG. 7A to 7D illustrate another packet formats for training signals in a communication system shown 100. FIGS. 7A to 7D correspond to FIGS. 6A to 6D, respectively. In FIGS. 7A to 7D, the amounts of timing shift are defined by associating them with a plurality of streams. Here, the timing shift amount of "0 ns" is defined for the first stream, the timing shift amount of "–400 ns" for the second stream, the timing shift amount of "–200 ns" for third second stream, and the timing shift amount of "–600 ns" for the fourth stream. Accordingly, the timing shift amounts of "–200 ns" and "–600 ns" are used in FIG. 7A, instead of the timing shift amounts of "0 ns" and "–400 ns" in the third and the fourth stream in FIG. 6A. On the other hand, the timing shift amounts of "–400 ns", "–200 ns" and "–600 ns" are used in FIGS. 7B and 7C, instead of the timing shift amounts of "0 ns", "–400 ns" and "–200 ns" in the second to the fourth stream in FIGS. 6B and 6C. The timing shift amount of "–600 ns" is used in FIG. 7D, instead of the timing shift amount of "0 ns" in the fourth stream in FIG. 6D.

Figure 7A:
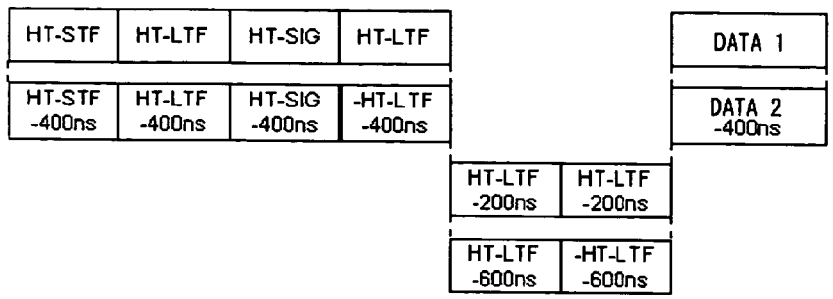
FIG. 7A to 7D illustrate another packet formats for training signals in a communication system shown in FIG. 2.
Figure 7B:
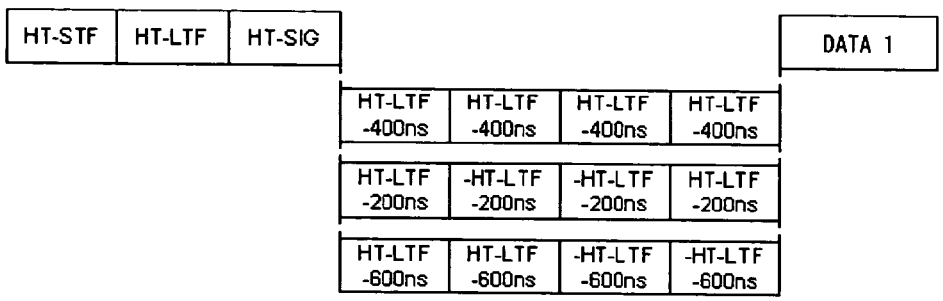
Figure 7C:
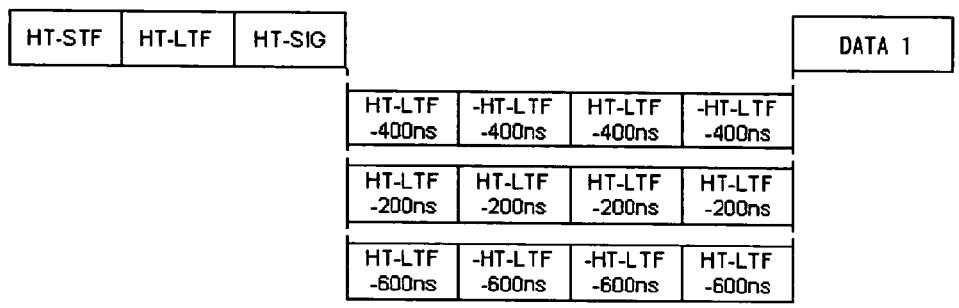
Figure 7D:
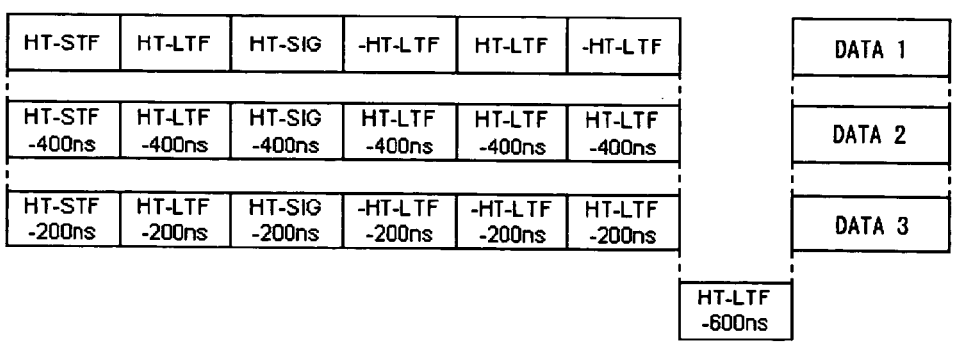

The packet format of FIG. 7C is structured the same way as for that of FIG. 7B. However, the combination of the signs of "HT-LTF" in FIG. 7C differs from that in FIG. 7B. The combinations of the signs of "HT-LTF" are given degrees of priority beforehand. That is, the degrees of priority are so defined that the combination of signs in the first stream of FIG. 7A has the highest degree of priority and that in the fourth stream thereof the lowest. For streams to which a data signal is assigned, the combinations of signs are used in order from one with the highest degree of priority, and also for streams to which a data signal is not assigned, the combinations of signs are used in order from one with the highest degree of priority. In this manner, the combinations of signs are set the same way as for the both cases. Hence, when the receiving apparatus retrieves the respective components by performing + (plus) and – (minus) operations, a common circuit can be used in both of the calculation of channel characteristics for the part of "HT-LTF" in streams to which Data is not assigned and the calculation of channel characteristics for the part of "HT-LTF" in streams to which Data is assigned.

FIG. 8 shows packet formats of a packet signal that is finally transmitted in the communication system 100. FIG. 8 corresponds to a modified version of a packet signal of FIG. 6D or FIG. 7D. An operation by orthogonal matrix to be explained later is carried out up to "HT-STF" and "HT-LTF", which are assigned to the first to third streams shown in FIG. 6D or FIG. 7D. As a result, "HT-STF1" to "HT-STF4" are generated. The same applies to other "HT-LTFs" as well. Furthermore, CDD is applied to each of the first to fourth streams by their respective timing shift amounts of "0 ns", "–50 ns", "–100 ns" and "–150 ns". Note that the absolute value of timing shift amount in the second CDD is so set as to be smaller than the absolute value of timing shift amount in the first CDD applied to HT-LTF. A similar processing is performed on "HT-LTF" assigned to the fourth stream and "DATA 1" and the like assigned to the first to third streams.

Figure 9:
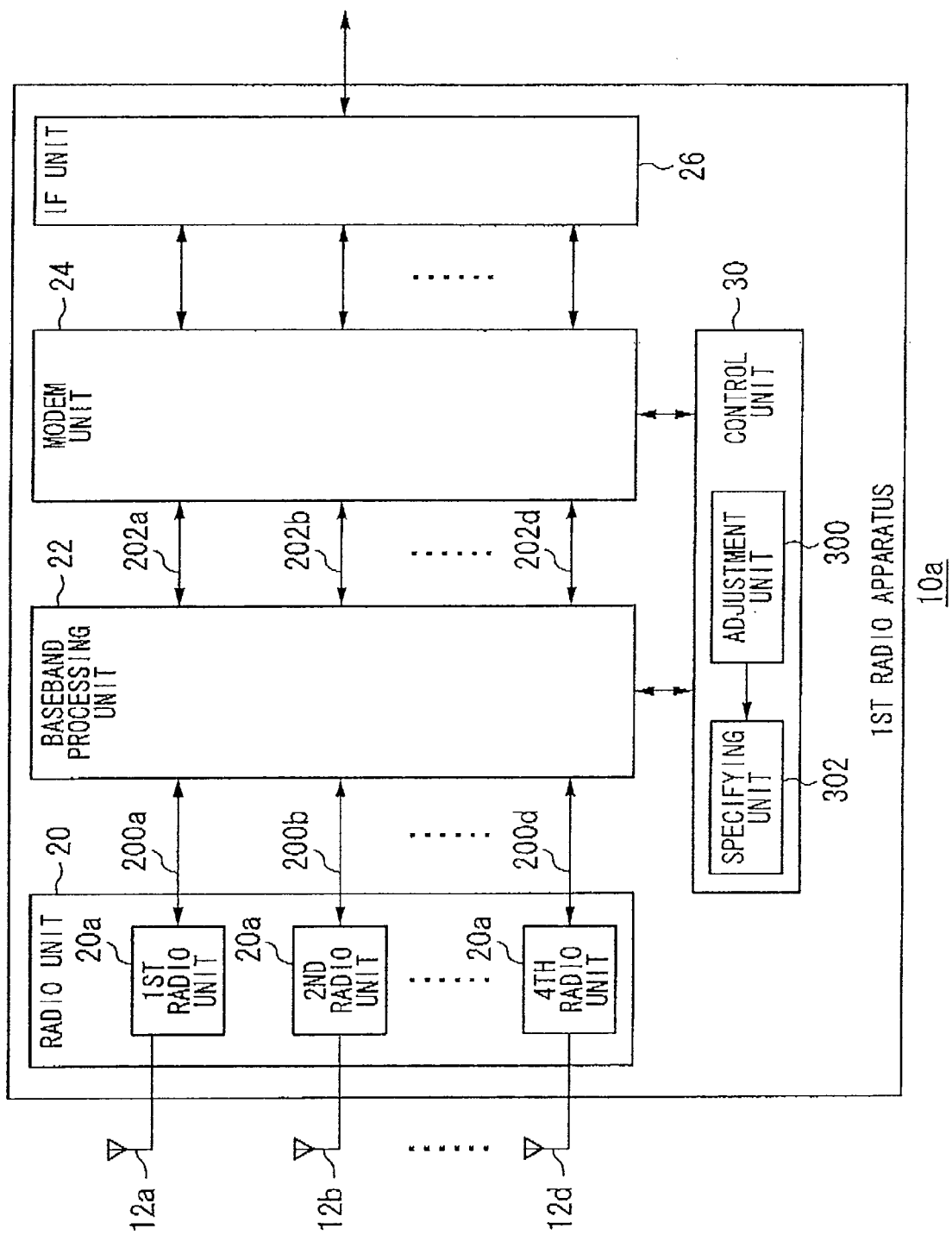
FIG. 9 illustrates a structure of a first radio apparatus shown in FIG. 2.

FIG. 9 illustrates a structure of a first radio apparatus 10a. The first radio apparatus 10a includes a first radio unit 20a, a second radio unit 20b, . . . and a fourth radio unit 24d, which are generically referred to as "radio unit 20", a baseband processing unit 22, a modem unit 24, an IF unit 26 and a control unit 30. Signals involved include a first time-domain signal 200a, a second time-domain signal 200b, . . . and a fourth time-domain signal 200d, which are generically referred to as "time-domain signal 200", and a first frequency-domain signal 202a, a second frequency-domain signal 202b, a third frequency-domain signal 202c and a fourth frequency-domain signal 202d, which are generically referred to as "frequency-domain signal 202". The second radio apparatus 10b has a structure similar to that of the first radio apparatus 10a. Accordingly, in the following description, the description on the receiving operation corresponds to the processing by the second radio apparatus 10b, whereas the description on the transmission operation corresponds to the processing by the first radio apparatus 10a.

As a receiving operation, the radio unit 20 carries out frequency conversion of radiofrequency signal received by the antennas 12 so as to derive baseband signals. The radio unit 20 outputs the baseband signals to the baseband processing unit 22 as the time-domain signals 200. The baseband signal, which is composed of in-phase components and quadrature components, shall generally be transmitted by two signal lines. For the clarity of figure, the baseband signal is presented here by a single signal line only. An AGC (Automatic Gain Control) unit and an A-D conversion unit are also included. The AGC unit sets gain in "L-STF" and "HT-STF".

As a transmission operation, the radio unit 20 carries out frequency conversion of baseband signals from the baseband processing unit 22 so as to derive radiofrequency signals. Here, the baseband signal from the baseband processing unit 22 is also indicated as the time-domain signal 200. The radio unit 20 outputs the radiofrequency signals to the antennas 12. That is, the radio unit 20 transmits radio-frequency packet signals from the antennas 12. A PA (Power Amplifier) and a D-A conversion unit are also included. It is assumed herein that the time-domain signal 200 is a multicarrier signal converted to the time domain and is a digital signal.

As a receiving operation, the baseband processing unit 22 converts a plurality of time-domain signals 200 respectively into the frequency domain and performs adaptive array signal processing on the thus converted frequency-domain signals. Then the baseband processing unit 22 outputs the result of adaptive array signal processing as the frequency-domain signals 202. One frequency-domain signal 202 corresponds to data contained respectively in a plurality of streams transmitted. As a transmission operation, the baseband processing unit 22 inputs, from the modem unit 24, the frequency-domain signals 202 serving as signals in the frequency domain, converts the frequency-domain signals into time domain and then outputs the thus converted signals as time-domain signals by associating them respectively to a plurality of antennas 12.

It is assumed that the number of antennas 12 to be used in the transmission processing is specified by the control unit 30. It is assumed herein that the frequency-domain signal 202, which is a signal in the frequency domain, contains a plurality of subcarrier components as shown in FIG. 1. For the clarity of figure, the frequency-domain signal is arranged in the order of the subcarrier numbers, and forms serial signals.

Figure 10:
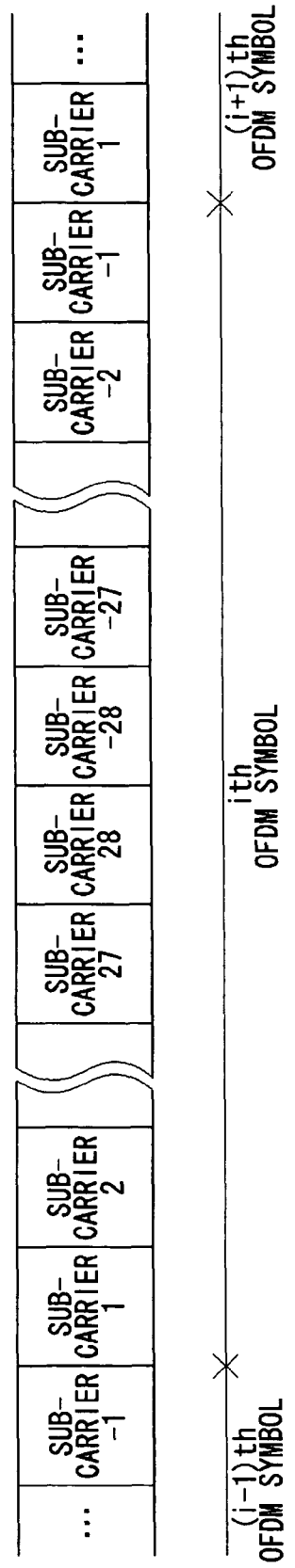
FIG. 10 illustrates a structure of a frequency-domain signal shown in FIG. 9.

FIG. 10 illustrates a structure of a frequency-domain signal. Assume herein that a combination of subcarrier numbers "−28" to "28" shown in FIG. 1 constitutes an "OFDM symbol". An "i"th OFDM symbol is such that subcarriers components are arranged in the order of subcarrier numbers "1" to "28" and subcarrier numbers "−28" to "−1". Assume also that an "(i−1)"th OFDM symbol is placed before the "i"th OFDM symbol, and an "(i+1)"th OFDM symbol is placed after the "i"th OFDM symbol. Note that, in "L-SIG" or the like, a combination of "−26" to "26" is used for one "OFDM symbol".

Now refer back to FIG. 9. To produce the packet formats corresponding to FIGS. 4A and 4B, FIGS. 5A and 5B, FIGS. 6A to 6D and FIGS. 7A to 7D, the baseband processing unit 22 carries out CDD. The baseband processing unit 22 performs the multiplication of a steering matrix to achieve the deformed or modified packet format as shown in FIG. 8. Such processing will be discussed later.

As a receiving processing, the modem unit 24 demodulates and deinterleaves the frequency-domain signal 202 outputted from the baseband processing unit 22. The demodulation is carried out per subcarrier. The modem unit 24 outputs the demodulated signal to the IF unit 26. As a transmission processing, the modem unit 24 carries out interleaving and modulation. The modem unit 24 outputs the modulated signal to the baseband processing unit 22 as a frequency-domain signal 202. When the transmission processing is carried out, the modulation scheme is specified by the control unit 30.

As a receiving processing, the IF unit 26 combines signals outputted from a plurality of modem units 24 and then forms one data stream. The IF unit 26 decodes the one data stream. The IF unit 26 outputs the decoded data stream. As a transmission processing, the IF unit 26 inputs one data stream, then codes it and, thereafter, separates the coded data stream. Then the IF unit 26 outputs the thus separated data to the plurality of modem units 24. When the transmission processing is carried out, the coding rate is specified by the control unit 30. Here, an example of the coding is convolutional coding, whereas an example of decoding is Viterbi decoding.

The control unit 30 controls the timing and the like of the first radio apparatus 10a. The control unit 30 performs a control on the IF unit 26, the modem unit 24 and the baseband processing unit 22 to transmit, in a predetermined period of time, a plurality of packets each of which is formed by at least one stream. The control unit 30 adjusts the number of streams for the respective plurality of packets. That is, the number of streams is adjusted according to the amount of data signal to be transmitted as packet signals wherein the data signal is one inputted to the IF unit 26. For example, when the amount of data is large, the number of streams is increased. Also, the control unit 30 may receive, in advance, the number of streams which can be processed by a receiving apparatus, and may adjust the number of streams for the packet signal according to the received number of streams.

The control unit 30 specifies a packet signal whose number of streams is maximum among the packet signals whose number of streams has been adjusted. The control unit 30 not only specifies a packet whose number of streams is maximum but also assigns the specified packet signal to a posterior part in a plurality of packet signals. The control unit 30 performs a control to achieve the arrangement of a plurality of packet signals as shown in FIG. 3. The control unit 30 produces packet signals structured by a plurality of streams as shown in FIGS. 4A and 4B, FIGS. 5A and 5B, FIGS. 6A to 6D, FIGS. 7A to 7D and FIG. 8 in cooperation with the IF unit 26, the modem unit 24 and the baseband processing unit 22. Though a description is given centering around the processing for producing the packet signals shown in FIGS. 6A to 6D and FIGS. 7A to 7D, the relevant part thereof may be executed for producing the packet signals shown in FIGS. 4A and 4B and FIGS. 5A and 5B.

The control unit 30 instructs the baseband processing unit 22 to assign HT-LTF and Data to a main stream in the specified packet signal. This corresponds to the arrangement in the main streams in FIGS. 6A to 6D and FIGS. 7A to 7D. The main streams correspond to the first to the third stream in FIG. 6D, for instance. While setting sub-streams, the control unit 30 assigns HT-LTFs to the sub-streams. Here, the control unit 30 assigns HT-LTF to the timing other than the timing to which HT-LTFs and Data in the main streams are assigned. This corresponds to the arrangement in the sub-streams in FIGS. 6A to 6D and FIGS. 7A to 7D. A sub-stream corresponds to the fourth stream in FIG. 6D, for instance.

The control unit 30 assigns HT-LTF and Data to at least one stream in the unspecified packet signals. This corresponds to the arrangement in FIGS. 4A and 4B and FIGS. 5A and 5B. Here, the format as shown in FIGS. 4A and 4B, that is, a format where HT-LTFs are assigned contiguously and L-LTF is assigned anterior thereto (hereinafter this format will be referred to as "first format") is defined. The format as shown in FIGS. 5A and 5B, that is, a format where HT-SIG is assigned between HT-LTFs (hereinafter this format will be referred to as "second format") is defined.

While using a first format for the leading packet signal in a plurality of packet signals, the control unit 30 uses a second format for the remaining packet signals. In other words, the first packet format is used for the packet signal 1 shown in FIG. 3 and the second packet format is used for the packet signal 2 to the packet signal 4. As known signals for the sub-streams in the specified packet signals, the HT-LTFs in the first format are used. In other words, the HT-LTFs in the first format are used for the sub-streams of the packet signal 4 shown in FIG. 3.

For the baseband processing unit 22, the control unit 30 applies CDD to HT-LTFs and the like assigned to the main streams. Note that the CDD is equivalent to applying a cyclic timing-shift within HT-LTF to HT-LTF assigned to the other streams, using HT-LTF assigned to a stream as a reference. The control unit 30 also applies CDD to HT-LTF assigned to sub-streams. The control unit 30 sets beforehand the degrees of priority for the amounts of timing shift. Here, as described above, "0 ns" has the highest degree of priority, and following this, the degrees of priority are set in descending order of "–400 ns", "–200 ns" and "–600 ns".

The control unit 30 has the baseband processing unit 22 use the amounts of timing shift for the main streams in order from one with the highest degree of priority. For example, in the case of FIG. 6D, "0 ns" is used for the first stream, "–400 ns" is used for the second stream, and "–200 ns" is used for the third stream. The control unit 30 has the baseband processing unit 22 use the amount of timing shift also for the sub-streams in order from one with the hightes degree of priority. For example, in the case of FIG. 6D, "0 ns" is used for the fourth stream. The control unit 30 has the baseband processing unit 22 apply CDD to Data, too. And the control unit 30 unit 30 has it use the amount of timing shift for the main streams, as the timing shift amount for Data. By employing the above-described processing, the packet signals having packet formats as shown in FIGS. 6A to 6D are produced.

On the other hand, aside from this, different vales of timing shift amounts may be set to a plurality of streams, respectively. For example, "0 ns" is set as the timing shift amount for the first stream, "–400 ns" is set as the timing shift amount for the second stream, "–200 ns" is set as the timing shift amount for the third stream, and "–600 ns" is set as the timing shift amount for the fourth stream. By executing this processing, the packet signals having packet formats as shown in FIGS. 7A to 7D are produced.

After the packet signals having packet formats as shown in FIGS. 6A to 6D and FIGS. 7A to 7D have been produced by executing the above-described processings, the control unit 30 has the baseband processing unit 22 deform or modify these packet signals and has it send the deformed packet signals to the radio unit 20. That is, the control unit 30 deforms or modifies the packet formats shown in FIGS. 6A to 6D and FIGS. 7A to 7D into the packet formats shown in FIG. 8. After extending the number of main streams to the number of a plurality of streams, the baseband processing unit 22 applies CDD to the extended streams. Also, after extending the number of sub-streams to the number of a plurality of streams, the baseband processing unit 22 applies CDD to the extended sub-streams. Here, the control unit 30 sets values of timing shift in a manner such that the timing shift amounts for the main streams are equal to those for the sub-streams.

In terms of hardware, this structure described as above can be realized by a CPU, a memory and other LSIs of an arbitrary computer. In terms of software, it can be realized by memory-loaded programs which have communication functions and the like, but drawn and described herein are function blocks that are realized in cooperation with those. Hence, it is understood by those skilled in the art that these function blocks can be realized in a variety of forms such as by hardware only, software only or the combination thereof.

Figure 11:
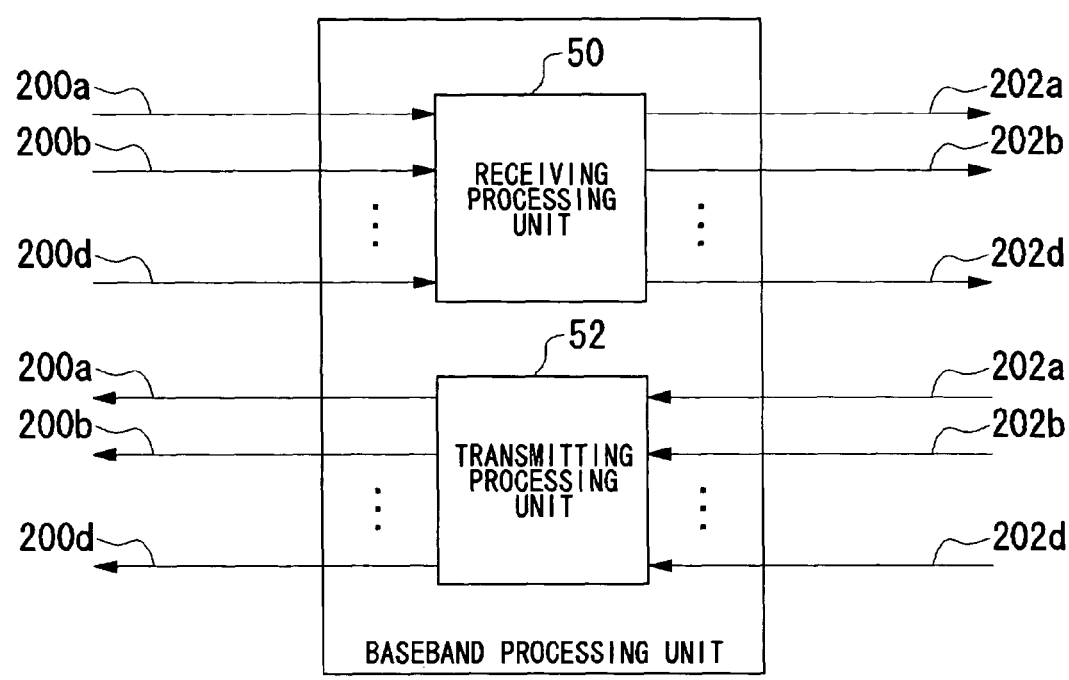
FIG. 11 illustrates a structure of a baseband processing unit shown in FIG. 9.

FIG. 11 illustrates a structure of a baseband processing unit 22. The baseband processing unit 22 includes a processing unit for use with receiving 50 and a processing unit for use with transmission 52. The receiving processing unit 50 executes a part, corresponding to a receiving operation, of operations by the baseband processing unit 22. That is, the receiving processing unit 50 performs adaptive array signal processing on time-domain signals 200 and therefore derives receiving weight vectors. Then the receiving processing unit 50 outputs the result of array synthesis as the frequency-domain signal 202. It is to be noted here that the receiving processing unit 50 may generate rate information based on the frequency-domain signals 202. As for the generation of rate information, a known technique serves the purpose as mentioned above and the explanation thereof is omitted here.

The transmitting processing unit 52 executes a part, corresponding to a transmission operation, of operations by the baseband processing unit 22. That is, the transmitting processing unit 52 converts the frequency-domain signal 202 so as to generate the time-domain signal 200. The transmitting processing unit 52 associates a plurality of streams with a plurality of antennas 12, respectively. The transmitting processing unit 52 applies CDD as shown in FIGS. 6A to 6D and FIGS. 7A to 7D, and executes an operation using a steering matrix. The transmitting processing unit 52 outputs finally the time-domain signals 200. On the other hand, the transmitting processing unit 52 may execute beamforming when transmitting the packet signals as shown in FIGS. 6A to 6D and FIGS. 7A to 7D. As for the beamforming, a known technique serves the purpose as mentioned above and the explanation thereof is omitted here.

Figure 12:
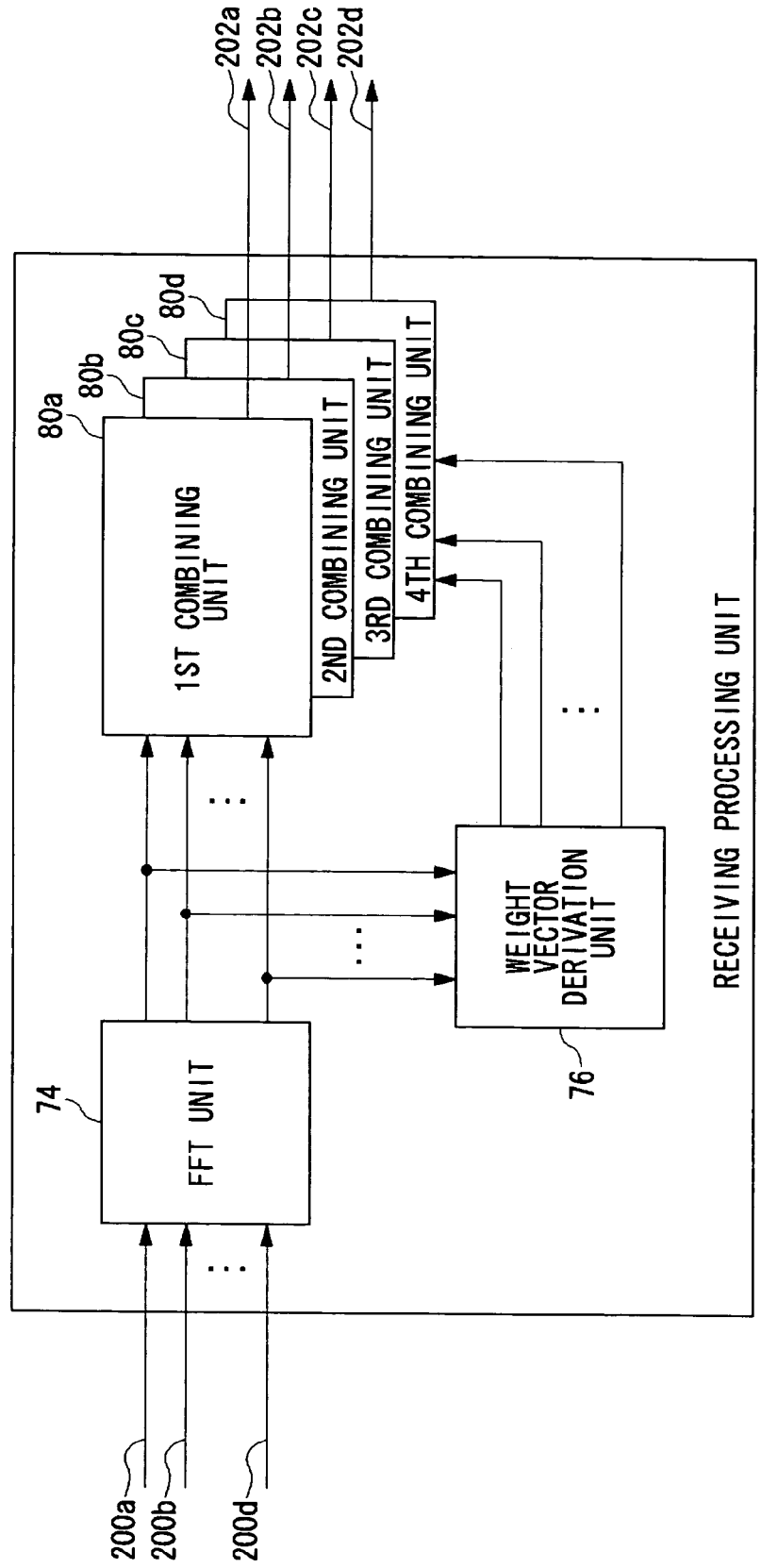
FIG. 12 illustrates a structure of a receiving processing unit shown in FIG. 11.

FIG. 12 illustrates a structure of the receiving processing unit 50. The receiving processing unit 50 includes an FFT unit 74, a weight vector derivation unit 76, and a first combining unit 80*a*, a second combining unit 80*b*, a third combining unit 80*c* and a fourth combining unit 80*d*, which are generically referred to as "combining unit 80".

The FFT unit 74 performs FFT on the time-domain signal 200 so as to convert the time-domain signal 200 into a frequency-domain value. It is assumed here that the frequency-domain value is structured as shown in FIG. 10. That is, a frequency-domain value for one time-domain signal 200 is outputted via one signal line.

The weight vector derivation unit 76 derives a weight vector from a frequency-domain value, on a subcarrier-by-subcarrier basis. The weight vector is so derived as to correspond to each of a plurality of streams, and a weight vector for one stream contains factors corresponding to the number of antennas, for each stream. HT-LTF and the like are used in deriving a weight vector corresponding to each of a plurality of streams. To derive the weight vector, an adaptive algorithm may be used or channel characteristics may be used. Since a known technique may be employed in the processing for the adaptive algorithm and so forth, the explanation thereof is omitted here. When deriving the weight vector, the weight vector derivation unit 76 executes an operation of the first component minus (–) the second component plus (+) the third component minus (–) the fourth component or the like, as described earlier. As also described above, the weights are derived finally for each of subcarriers, antennas 12 and streams, respectively.

The combining unit 80 combines the frequency-domain value converted by the FFT unit 74 and the weight vector from the weight vector derivation unit 76. For example, as the weight vector to which a multiplication is to be executed, a weight which corresponds to both one subcarrier and the first stream is selected from among the weight vectors from the weight vector derivation unit 76. The selected weight has a value corresponding to each antenna 12.

As another weight vector to which a multiplication is to be executed, a value corresponding to one subcarrier is selected from among the frequency-domain values converted by the FFT unit 74. The selected value contains a value corresponding to each antenna 12. Note that both the selected weight and the selected value belong to the same subcarrier. While being associated respectively with the antennas 12, the selected weight and the selected value are respectively multiplied and the multiplication results are summed up. As a result, a value corresponding to one subcarrier in the first stream is derived. In the first combining unit 80a, the above-described processing is performed on the other subcarriers so as to derive data corresponding to the first stream. The similar processing is carried out to derive data corresponding respectively to the second to fourth streams. The derived first to fourth streams are outputted as the first frequency-domain signal 202a to the fourth frequency-domain signal 202d, respectively.

Figure 13:
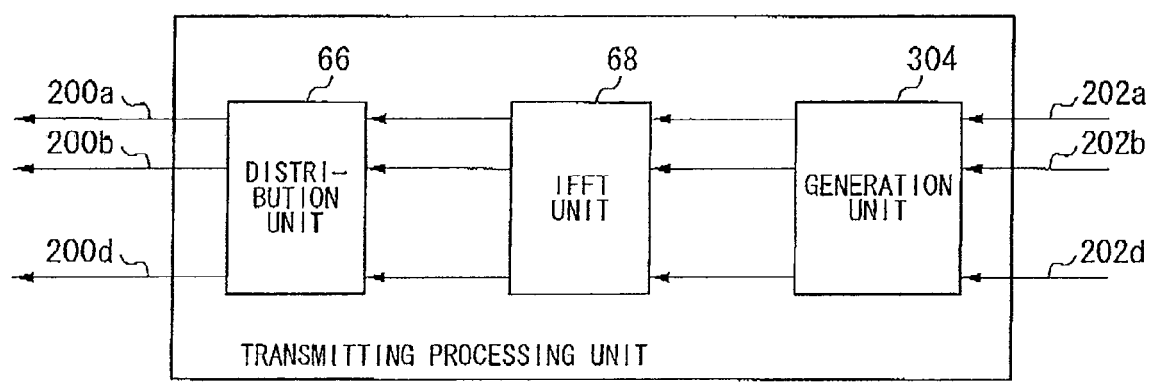
FIG. 13 illustrates a structure of a transmitting processing unit shown in FIG. 11.

FIG. 13 illustrates a structure of the transmitting processing unit 52. The transmitting processing unit 52 includes a distribution unit 66 and an IFFT unit 68. The IFFT unit 68 performs IFFT on the frequency-domain signals 202 and then outputs time-domain signals. As a result thereof, the IFFT unit 68 outputs the time-domain signal corresponding to each stream.

The distribution unit 66 associates the streams from the IFFT unit 68 with the antennas 12. To produce the packet signals corresponding to FIGS. 4A and 4B, FIGS. 5A and 5B, FIGS. 6A to 6D and FIGS. 7A to 7D, the distribution unit 66 carries out CDD. CDD is expressed as a matrix C in the following Equation (1).

$$C(\lambda) = \mathrm{diag}(1, \exp(-j2\pi\lambda\delta/N_{out}), \Lambda, \exp(-j2\pi\lambda\delta(N_{out}-1)/N_{out})) \quad (1)$$

where $\delta$ indicates a shift amount and $\lambda$ a subcarrier number. The multiplication of the matrix C by a stream is done on a subcarrier-by-subcarrier basis. That is, the distribution unit 66 carries out a cyclic time shifting within the L-STF and so forth per stream. The amount of timing shift is so set as shown in FIGS. 4A and 4B, FIGS. 5A and 5B, FIGS. 6A to 6D and FIGS. 7A to 7D.

The distribution unit 66 may multiply respectively the training signals produced, as in FIGS. 6A to 6D and FIGS. 7A to 7D, by a steering matrix so as to increase the number of streams for training signal up to the number of a plurality of streams. Before carrying out multiplication, the distribution unit 66 extends the degree of inputted signals to the number of a plurality of streams. Since "HT-STF" and the like are assigned to the first to the third stream in the case of FIG. 6D and FIG. 7D, the number of signals inputted is "3" and this will be represented by "Nin" here. Accordingly, the inputted data are indicated by a vector of "Nin×1". The number of a plurality of streams is "4" and this is represented by "Nout" here. The distribution unit 66 extends the degree of inputted data to Nout from Nin. In other words, the vector of "Nin×1" is extended to the vector of "Nout-1". In so doing, "0" is inserted to components from the (Nin+1)th row to the Nout-th row. On the other hand, the component up to Nin are "0's" for "HT-LTF" assigned to the fourth stream of FIG. 6D and FIG. 7D, and HT-LTF and the like are inserted to the components from (Nin+1)th row to the Nout-th row A steering matrix is expressed by the following Equation (2).

$$S(\lambda) = C(\lambda) W \quad (2)$$

The steering matrix is a matrix of "Nout×Nout". W is an orthogonal matrix of "Nout×Nout". An example of the orthogonal matrices is a Walsh Matrix. Here, $\lambda$ is the subcarrier number, and the multiplication by a steering matrix is done on a subcarreri-by-subcarrier basis. C denotes CDD as described above. Here, the amounts of timing shift are so defined as to differ for a plurality of streams, respectively. That is, the amounts of timing shift for the first to the fourth stream are defined to be, for example, "0 ns", "−50 ns" "−100 ns" and "−150 ns", respectively.

Figure 14:
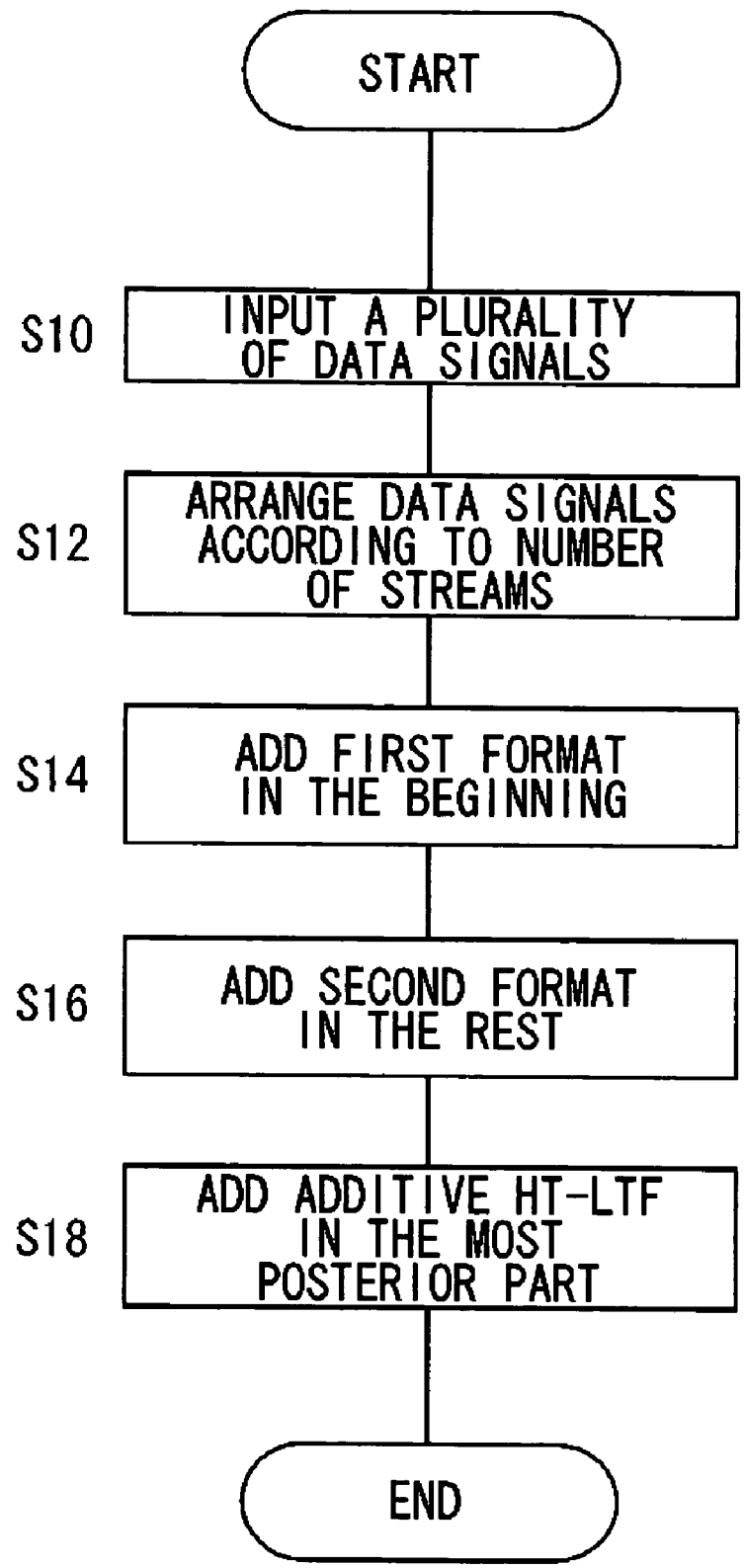
FIG. 14 is a flowchart showing a procedure of transmission processing at a first radio apparatus shown in FIG. 9.

FIG. 14 is a flowchart showing a procedure of transmission processing at the first radio apparatus 10a. The IF unit 26 inputs a plurality of data signals (S10). The control unit 30 arranges the data signals according to the number of streams (S12). The control unit 30 places data signals with smaller numbers of streams frontward and data signals with larger numbers of streams rearward. The control unit 30 attaches a first format to the top packet signal (S14) and a second format to the remaining packet signals (S16) in a baseband processing unit 22. The control unit 30 appends an extensional HT-LTF to a sub-stream at a rear portion (S18).

According to an embodiment of the present invention, an extensional HT-LTF is placed for packet signals with larger numbers of streams wherein data are placed, so that the duration of an extensional HT-LTF can be made shorter. And the shorter duration of an extensional HT-LTF improves the transmission efficiency. The placement of packet signals with an extensional HT-LTF in the rear part allows a terminal apparatus to estimate the latest channel characteristics. Moreover, the use of a first format for the top packet signal of a plurality of packet signals ensures compatibility with legacy systems. The use of a second format for the rest of a plurality of packet signals improves the transmission efficiency. Furthermore, the use of the HT-LTF portion of the first format in the extensional HT-LTF improves the transmission efficiency.

At the time of producing the training signals, the number of streams to which HT-STFs are assigned are made equal to that of streams to which Data are assigned. Thus the gain set by HT-STF corresponds Data and therefore the deterioration of data receiving characteristics can be prevented. Moreover, at the time of producing the training signals, the timing, to which Data is assigned, in a stream where Data is assigned is shifted or staggered from the timing, to which HT-LTF is assigned, in a stream where Data is not assigned. Hence, the received powers of both the streams can be brought closer to each other. Since the received powers of both the streams are brought closer to each other, the deterioration of estimation in specifying a channel by a stream can be suppressed even if HT-STF is not assigned in said stream where Data is not assigned.

More of the same timing shift amounts can be used by defining the degrees of priority for the timing shift amounts and using the timing shift amounts in order from one with the highest degree of priority for both the stream where data is assigned and the stream where data is not assigned. Moreover, the processing may be made simpler by using more of the same timing shift amounts. Further, when the number of a plurality of streams is "2" and the number of streams to which data is assigned is "1", a receiving apparatus may instruct a transmitting apparatus which of the plurality of streams is to have data assigned, according to the receiving condition of HT-LTF. In other words, it is possible to execute transmission diversity.

Since the timing shift amounts for the respective HT-LTFs assigned to a plurality of streams are of the same values, a receiving apparatus can cope easily when there are changes in streams that have data assigned. Since different timing shift amounts are set for a plurality of streams, respectively, the processing can be carried out uniformly. Moreover, such a uniformly performed processing makes the processing simpler. Even when the number of streams where data is assigned increases in the subsequent packet signal, the HT-LTF for the stream to have the increase thereof has already been transmitted with the same timing shift amount, so that the receiving apparatus can use the already derived timing and the like. Since it can use the already derived timing and the like, the receiving apparatus can easily cope with the increase in the number of streams where data is assigned.

The present invention has been described based on the embodiments which are only exemplary. It is therefore understood by those skilled in the art that other various modifications to the combination of each component and process are possible and that such modifications are also within the scope of the present invention.

According to the embodiments of the present invention, the description has been given of a case when the number of multistreams is "4". However, the present invention is not limited thereto and, for example, the number of a plurality of streams may be less than "4" or may be greater than "4". Along with this example, the number of antennas 12 may be less than "4" in the former case and may be greater than 4" in the latter case. According to this modification, the present invention can be applied to a variety of the number of streams.

While the preferred embodiments of the present invention have been described using specific terms, such description is for illustrative purposes only, and it is to be understood that changes and variations may be made without departing from the spirit or scope of the appended claims.

What is claimed is:

1. A radio apparatus for transmitting, in a predetermined period of time, a plurality of packet signals each of which is formed by streams transmitted from a plurality of antennas in parallel, the apparatus comprising:
    an adjustment unit which adjusts the number of streams for the plurality of packet signals, respectively;
    a specifying unit which specifies a packet signal whose number of streams is maximum among the packet signals whose numbers of streams have been adjusted by said adjustment unit;
    a generation unit which includes a first means that assigns known signals and data signals to the streams, respectively, for the packet signal specified by said specifying unit and assigns extensional known signals to another stream to which no data signals are assigned by setting the another stream to which no data signals are assigned, and a second means that assigns a known signal and a data signal to at least one stream for a packet signal not specified by said specifying unit; and
    a transmitter which transmits a plurality of packet signals generated by said generation unit.

2. A radio apparatus according to claim 1, wherein said specifying unit not only specifies a packet signal whose number of streams is maximum but also assigns the specified packet signal to a rear position in the plurality of packet signals.

3. A radio apparatus according to claim 1, wherein, for the packet signal specified by said specifying unit, said generation unit assigns an extensional known signal to a timing other than a timing to which a data signal and a known signal are assigned.

4. A radio apparatus according to claim 1, wherein said generation unit defines a first format in which known signals are contiguously arranged and a control signal is assigned to an anterior part thereof and another known signal is assigned anterior to the control signal, and a second format in which a control signal is assigned between known signals,
    while among the plurality of packet signals the first format is used in a leading packet signal, the second format is used in the remaining packet signals, and
    a known signal in the first format is used as a known signals in another stream in the packet signal specified by said specifying unit.

5. A radio apparatus for transmitting, in a predetermined period of time, a plurality of packet signals each of which is formed by streams transmitted from a plurality of antennas in parallel, the apparatus comprising:
    an adjustment unit which adjusts the number of streams for the plurality of packet signals, respectively;
    a specifying unit which specifies a packet signal whose number of streams is maximum among the packet signals whose numbers of streams have been adjusted by said adjustment unit;
    a generation unit which includes a first means that assigns known signals and data signals to the streams, respectively, for the packet signal specified by said specifying unit and assigns extensional known signals to another stream by setting the another stream, and a second means that assigns a known signal and a data signal to at least one stream for a packet signal not specified by said specifying unit; and
    a transmitter which transmits a plurality of packet signals generated by said generation unit
    wherein said generation unit is such that
    for the packet signal specified by said specifying unit, using a known signal, as a reference, assigned to one of main streams where a data signal is assigned, a cyclic timing shift within a known signal is applied to a known signal assign to the other streams and a timing shift is also applied to an extensional known signal assigned to sub-streams where no data signal is assigned,
    degrees of priority are set beforehand to amounts of timing shift and, for the main streams, the amounts of timing shift are used, in order, from one having a higher degree of priority, and
    for the sub-streams, the amounts of timing shift are used, in order, from one having a higher degree of priority.

6. A radio apparatus for transmitting, in a predetermined period of time, a plurality of packet signals each of which is formed by streams transmitted from a plurality of antennas in parallel, the apparatus comprising:
    an adjustment unit which adjusts the number of streams for the plurality of packet signals, respectively;
    a specifying unit which specifies a packet signal whose number of streams is maximum among the packet signals whose numbers of streams have been adjusted by said adjustment unit;
    a generation unit which includes a first means that assigns known signals and data signals to the streams, respectively, for the packet signal specified by said specifying unit and assigns extensional known signals to another stream to which no data signals are assigned by setting the another stream to which no data signals are assigned, and a second means that assigns a known signal and a data signal to at least one stream for a packet signal not specified by said specifying unit; and
    a transmitter which transmits a plurality of packet signals generated by said generation unit,
    wherein said generation unit is such that for the packet signal specified by said specifying unit, using a known signal, as a reference, assigned to one of main streams where a data signal is assigned, a cyclic timing shift within a known signal is applied to a known signal assign to the other streams and a timing shift is also applied to an extensional known signal assigned to sub-streams where no data signal is assigned, and different values of amounts of timing shift are set to the plurality of streams, respectively.

7. A radio apparatus according to claim 5, wherein in said generation unit the known signal and the extensional known signal are formed by repeating a predetermined unit in time domain,
   a combination of signs of the predetermined unit is defined so that an orthogonality holds among the streams, and
   the combination of signs of the predetermined unit is so defined as to be fixed in the plurality of streams, respectively.

8. A radio apparatus according to claim 5, wherein in said generation unit the known signal and the extensional known signal are formed by repeating a predetermined unit in time domain,
   while a combination of signs of the predetermined unit is defined so that an orthogonality holds among the streams, a degree of priority is given beforehand to the combination of signs of the predetermined unit, and
   for a stream where a data signal is assigned, combinations of signs are used in order, from one having a higher degree of priority and, for a stream where no data signal is assigned, combinations of signs are used in order, from one having a higher degree of priority.

9. A radio apparatus according to claim 5, wherein said generation unit is such that the cyclic timing shift is also applied to a data signal in the packet signal specified by said specifying unit, and an amount of timing shift for the main streams is used as the amount of timing shift.

10. A radio apparatus according to claim 5, further comprising a modification unit which modifies at least the packet signal, specified by said specifying unit, among the plurality of packet signals generated by said generation unit and outputs a modified signal to said transmitter,
    said modification unit including:
    a first processing unit which extends the number of main streams up to the number of a plurality of streams and then, for the extended stream, applies a cyclic timing shift within a known signal to a known signal assigned to the other streams using as a reference a known signal assigned to one of the extended streams; and
    a second processing unit which extends the number of sub-streams up to the number of a plurality of streams and then, for the extended streams, applies a cyclic timing shift within an extensional known signal to an extensional known signal assigned to the other streams using as a reference an extensional known signal assigned to one of the extended streams,
    wherein the amount of timing shift is set in a manner that the respective values of timing shift amounts used for the extended streams in the first processing unit are respectively equal to those for the extended streams in the second processing unit.

11. A radio apparatus according to claim 10, wherein an absolute value of the timing shift amount in said generation unit is so set as to be greater than that in said modification unit.

* * * * *